United States Patent

[11] 3,619,332

[72] Inventor  Hendrikus Johannus Bongers
             Huls, Krefeld, Germany
[21] Appl. No. 747,506
[22] Filed    July 25, 1968
[45] Patented Nov. 9, 1971
[73] Assignee G. Siempelkamp & Co.
             Krefeld, Rhineland, Germany
[32] Priority July 25, 1967
[33]          Germany
[31]          P 17 04 999.9

[54] SYSTEM FOR CURING ELONGATE WORKPIECES
     4 Claims, 3 Drawing Figs.
[52] U.S. Cl. .................................................... 156/583,
             18/16 P, 18/17 H, 18/17 P, 100/207, 156/137,
                                              156/179, 156/543
[51] Int. Cl. .................................................... B30b 15/34,
                                                          B32b 31/00
[50] Field of Search ......................................... 18/16 R, 16
             P, 17 H, 17 P; 156/580, 583, 543, 137, 179;
                                                          100/207

[56]                    References Cited
                  UNITED STATES PATENTS
3,050,777   8/1962   Siempelkamp ...............   18/16 P
3,209,405  10/1965   Lorwenfeld ..................   18/16 P Primary Examiner—Benjamin R. Padgett
Attorney—Karl F. Ross ABSTRACT: An elongate workpiece of flexible polymeric material, such as a conveyor belt, is passed back and forth through different stages of a multiplaten press for simultaneous curing of two or more sections of this workpiece.

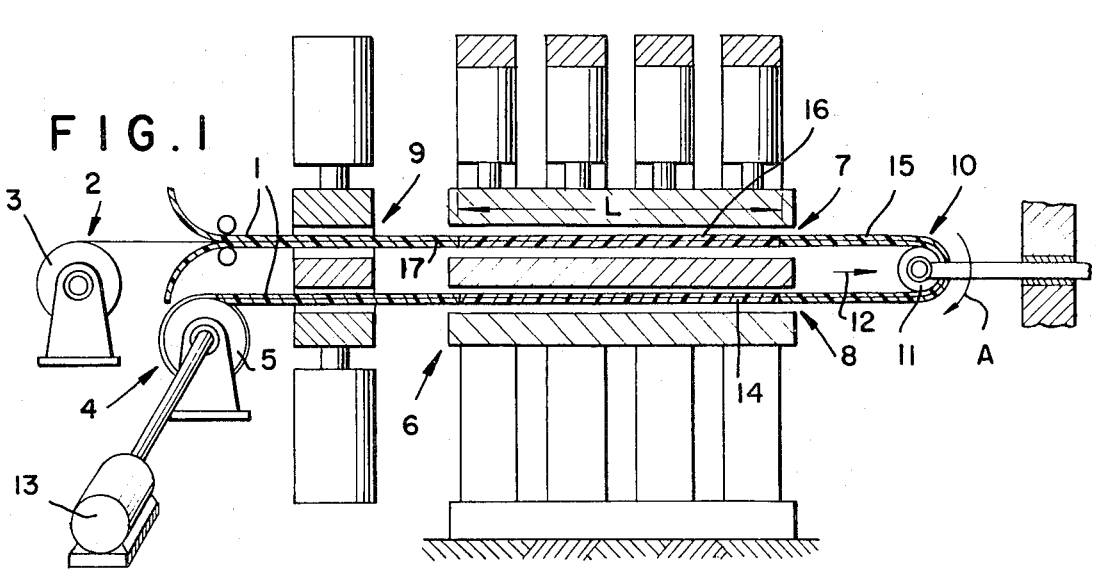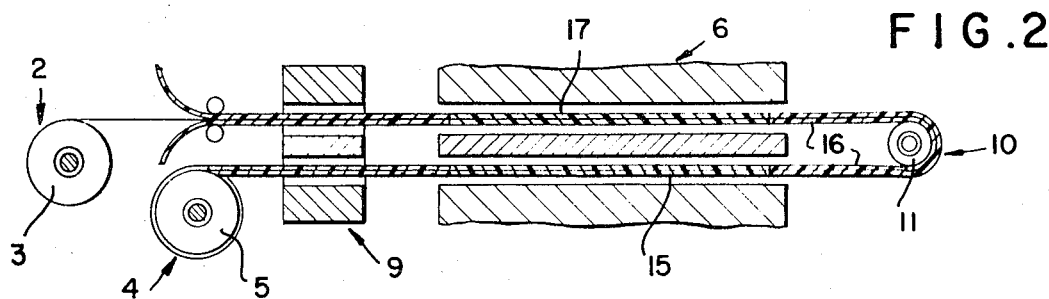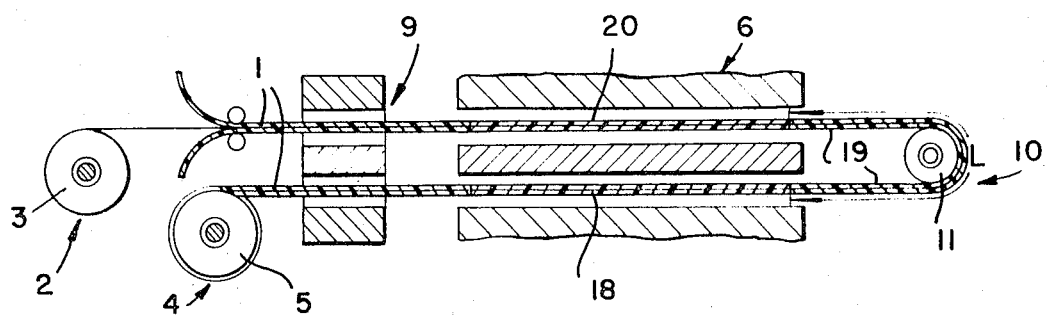

SYSTEM FOR CURING ELONGATE WORKPIECES

FIELD OF THE INVENTION

My present invention relates to a system for curing elongate workpieces of polymeric material, such as conveyor belts, by heat and/or pressure; the term "curing" includes vulcanization in the case of rubber and final polymerization in the case of synthetic resin.

BACKGROUND OF THE INVENTION

In commonly owned U.S. Pat. application Ser. No. 611,626, filed 25 Jan. 1967 by Gerhard Hütz and me, there is disclosed a system for curing such workpieces in a press with parallel strands of wire or other elongate tension elements embedded in the polymeric material, these strands being sandwiched between two layers of rubber or synthetic resin to be bonded thereto; the composite workpiece is intermittently advanced from a supply source to a takeup drum by way of a clamping station and a laminating press, the clamping station being supported on a carriage reciprocable in the direction of workpiece movement so that the workpiece is periodically fed through the press as the clamp is closed during a forward motion of the carriage whereupon the press is operated and the carriage is retracted after a release of its clamp to repeat the process.

OBJECTS OF THE INVENTION

The principal object of my present invention is to provide an improved curing system of this general type to enable a more rational utilization of space and equipment in the manufacture of conveyor belts and similar workpiece.

If the simple press of the above-identified copending application is replaced by a multiplaten press, e.g. of the type disclosed in U.S. Pat. No. 3,050,777 (Siempelkamp), several workpieces could be concurrently processed in the manner described. This mode of production, however, is practical only when all the workpieces are of the same length since otherwise the plant would have to be halted upon completion of the treatment of one workpiece or certain stages of the press would run idle during part of the time. Also, the workpiece would have to consist of substantially identical materials curable under similar conditions of heat and pressure.

A more specific object of my invention is to provide a system of the type set forth wherein an individual workpiece can be cured in a fraction of the time required for its curing by the aforedescribed process so that the equipment can handle several such workpieces in the time heretofore required for one workpiece with avoidance of the aforementioned limitations and inconveniences.

SUMMARY OF THE INVENTION

These objects are realized, pursuant to my present invention, by passing the workpiece back and forth through two or more stages of a multiplaten press, operating the press for simultaneous curing of different workpiece sections in respective press stages, and advancing the workpiece after each operation through the several press stages for introducing uncured workpiece sections adjacent the previously cured sections into these stages preparatorily to another curing operation.

DESCRIPTION OF THE DRAWING

The invention will be described in greater detail with reference to the accompanying drawing in which:

FIG. 1 diagrammatically illustrates, in side-elevational view, a system for curing conveyor belts or the like in accordance with my present invention; and FIGS. 2 and 3 are views similar to FIG. 1, showing a workpiece in different treatment positions.

SPECIFIC DESCRIPTION

The system shown in FIGS. 1-3 comprises a multiplaten press 6, e.g. of the type described in the above-identified Siempelkamp patent, with a plurality of press stages of which only a first stage 7 and a second stage 8 have been illustrated; the effective length of these stages, in the direction of advance A of a workpiece 1, has been designated L. The workpiece may be composed of layers of rubber or synthetic resin with interposed wires, threads, wire netting, fabric or other reinforcements to be bonded to these layers by the curing operation.

The workpiece 1 is drawn from a reel 3 at a supply station 2 and forms an upper run which passes through a clamping station 9 and a first press stage 7 to a roller 11 at a deflecting and tensioning station 10; from this roller a lower run of the workpiece traverses the press stage 8 and the clamping stage 9 beyond which it is wound upon a takeup reel 5 at a terminal station 4. A motor 13 coupled with reel 5 serves as a drive means for intermittently and simultaneously operating the supply and takeup reels to advance the workpiece 1 through the clamp 9 and the press 6.

The workpiece 1 is considered divided into a multiplicity of adjoining sections of length L, these sections being designated 14 through 20 in FIGS. 1-3. In the position of FIG. 1, the first section 14 is held stationary in the lower heated-platen press stage 8 while the third section 15 is disposed in the upper press stage 7; upon closure of the clamp 9, roller 11 is moved to the right (arrow 12) to tension the two runs of the workpiece including sections 14-16 whereupon the press 6 is operated to cure the sections 14 and 16. The length of the loop formed by the workpiece around roller 11 is equal to L so that the part of the workpiece lying between the discharge end of stage 7 and the entrance end of stage 8 corresponds exactly to an untreated section (i.e. section 15) lying between two treated sections (14 and 16). After the curing operation, press 6 is reopened along with clamp 9 whereupon motor 13 is actuated to advance the workpiece 1 by a distance equal to L; this brings the hitherto untreated conveyor section 15 into stage 8 and a new conveyor section 17 into stage 7, as illustrated in FIG. 2. The operation is thereupon repeated, followed by an actuation of motor 13 to advance the workpiece by a distance equal to 3L whereby three further sections 18, 19 and 20 are disposed in stage 8, in the loop around roller 11 and in stage 7, respectively. Thus, in the course of three successive press operations, seven sections 14-20 of workpiece 1 have been cured.

The length of the loop around roller 11 may be made equal to any multiple $nL$ of the curing length L, with $n$ a whole number not necessarily equal to unity as in the illustrated embodiment. In such case, naturally, the rate of advance of the workpiece between press operations would have to be suitably modified. In practice, in order to assure continuous curing, this loop may be made slightly shorter than $nL$ so that successively cured sections overlap slightly.

Naturally, the principle herein disclosed may be extended to include deflecting stages on both sides of the press 6, with the workpiece passing three or more times through a corresponding number of press stages. Furthermore, the motor 13 is representative of any means (including a reciprocating carriage as described in the above-identified application) for periodically advancing the workpiece a predetermined number of lengths L. These and other modifications, readily apparent to persons skilled in the art, are intended to be embraced within the spirit and scope of my invention except as otherwise limited in the appended claims.

I claim:

1. A system for curing an elongate workpiece of polymeric material, comprising:
    a multiplaten press having a plurality of heated-platen stages traversable by said workpiece;
    supply means including a source of polymeric-material strip forming the elongate workpiece and workpiece-entraining means drivable for intermittently advancing said workpiece through said press;

takeup means synchronized with said supply means positioned to receive a cured portion of said workpiece upon concurrent passage of different sections of the workpiece through respective stages of said press;

and deflecting means engageable with a part of said workpiece located between said sections for holding the workpiece taut between said supply means and said takeup means.

2. A system as defined in claim 1 wherein said deflecting means comprises a roller positioned to receive a first run of the workpiece emerging from a discharge end of a first press stage and to direct a second run of the workpiece to an entrance end of another press stage.

3. A system as defined in claim 2 wherein the length of the path of the workpiece from said discharge end around said roller to said entrance end is substantially equal to a whole number times the effective length of each of said stages in the direction of workpiece movement.

4. A system as defined in claim 2, further comprising clamping means on the side of said press remote from said roller for concurrently gripping said first and second runs, said roller being displaceable in a direction away from the press for tensioning said runs in an open position of the press and upon closure of said clamping means.

* * * * *